United States Patent [19]
Holberg

[11] 3,852,972
[45] Dec. 10, 1974

[54] SUBMERGED PIPELINE BURIAL APPARATUS

[76] Inventor: Robert Holberg, 608 W. Bough Ln., Houston, Tex. 77024

[22] Filed: May 17, 1973

[21] Appl. No.: 361,151

[52] U.S. Cl.................................. 61/72.4, 37/62
[51] Int. Cl.............................................. E02f 5/06
[58] Field of Search............ 61/72.4; 37/DIG.16, 62, 37/63

[56] References Cited
UNITED STATES PATENTS

| | | | |
|---|---|---|---|
| 3,368,358 | 2/1968 | Elliott | 61/72.4 |
| 3,670,514 | 6/1972 | Breston | 61/72.4 |
| 3,681,863 | 8/1972 | Solntsev et al. | 37/DIG. 16 |

Primary Examiner—Jacob Shapiro
Attorney, Agent, or Firm—Pravel & Wilson

[57] ABSTRACT

The present invention includes a submerged pipeline burial apparatus comprising a support structure carried along the pipeline by a movable carriage and a plurality of inclined augers supported by the structure with their forward ends beneath the pipe and their rear ends above the pipe for cutting or digging bottom material from beneath the pipe to form a trench in which the pipe is buried. The undercut material is deposited on the bottom adjacent the trench where water currents and wave motion will subsequently fill the trench to cover the pipeline.

7 Claims, 6 Drawing Figures

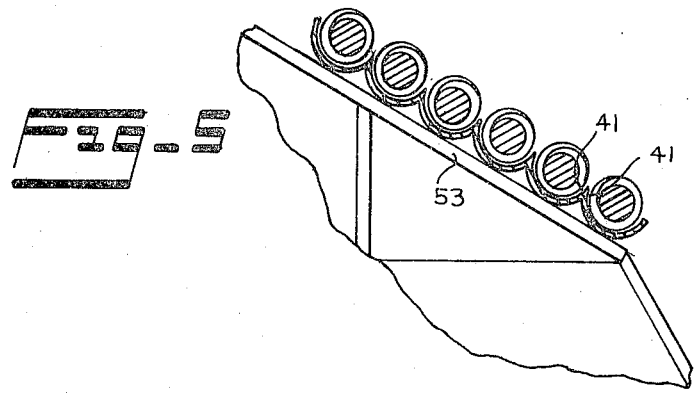
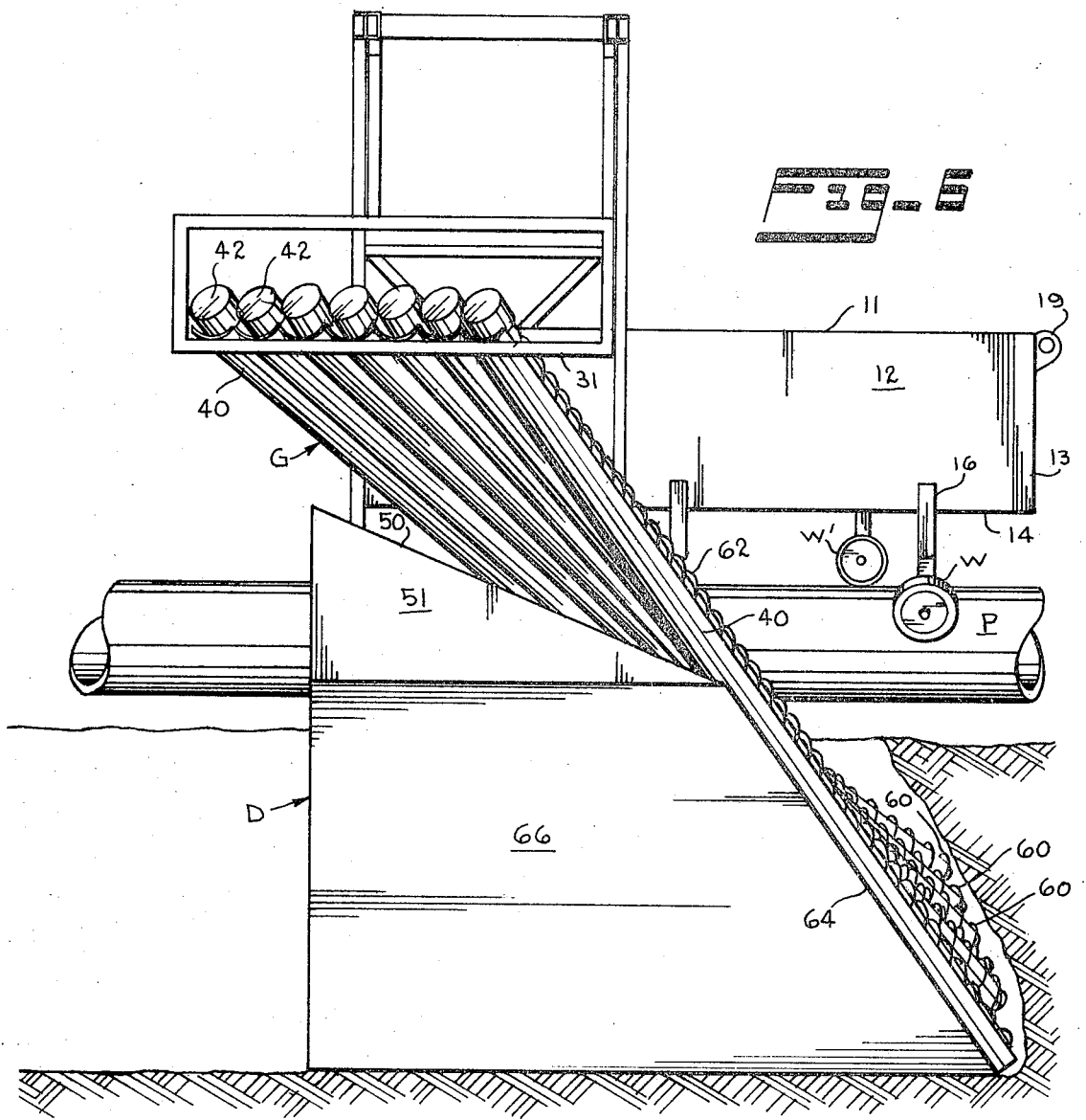

SUBMERGED PIPELINE BURIAL APPARATUS

BACKGROUND OF THE INVENTION

1. Field of the Invention

The present invention relates to pipeline trenching apparatus and particularly to an apparatus for burying a submerged pipeline in a trench.

2. Brief Description of the Prior Art

There are various prior art sub-sea pipeline trenching devices which typically employ either a rotating cutter, such as used with the dredge, or which employs a plurality of jets for displacing the bottom material and which typically includes a plurality of conduits or pipes employing a negative pressure to move the dislodged or displaced bottom material aside so as to form a trench for receiving the pipe.

SUMMARY OF THE INVENTION

The present invention provides a new and improved submerged pipeline burying apparatus which progressively digs a trench beneath a pipeline in place on the bottom of a water body and which allows the pipeline to settle into place in the trench behind the trenching apparatus. The trenching device includes a carriage adapted to move along the pipeline to guide the trenching machine and a framework supported by the carriage for carrying a plurality of inclined augers which extend beneath the pipeline for undercutting a segment of soil beneath the pipeline and for removing and transporting the undercut bottom material to a position adjacent the sides of the trench as the trench is cut beneath the pipe. With each of the augers there is provided a tray which facilitates the lateral and upward movement of the bottom material after it has been dislodged or displaced from beneath the pipeline as the bottom material is undercut from beneath the pipe, some of the material falls on to the augers and is broken into smaller chunks and pieces as it is moved laterally to the sides of the pipe. Further, the invention includes a hydraulic drive arrangement whereby the augers are preferably rotated with individual hydraulic motors and whereby a hydraulic drive is provided for moving the carriage along the pipeline.

BRIEF DESCRIPTION OF THE DRAWINGS

FIG. 5 is a view taken on line 5—5 of FIG. 1 showing further details of the auger construction and;

FIG. 6 is a side view of the ditching apparatus with one side of the ditch cut away showing the ditch guide positioned beneath the augers for holding the sides of the ditch in place after the cut material has been removed.

DESCRIPTION OF THE PREFERRED EMBODIMENT

Figure 1:
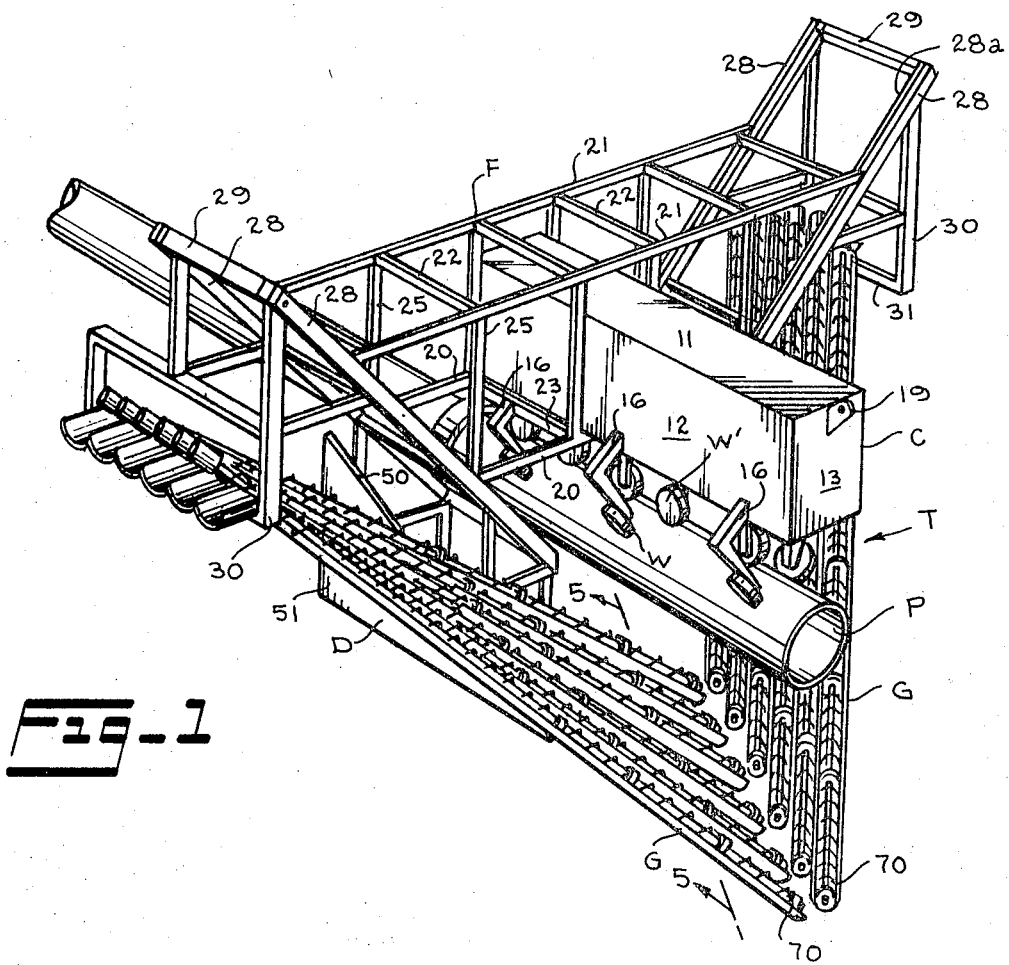
FIG. 1 is an isometric view showing the ditching apparatus in position beneath the pipeline with the carriage which guides the ditching apparatus positioned on top of the pipeline.
Figure 2:
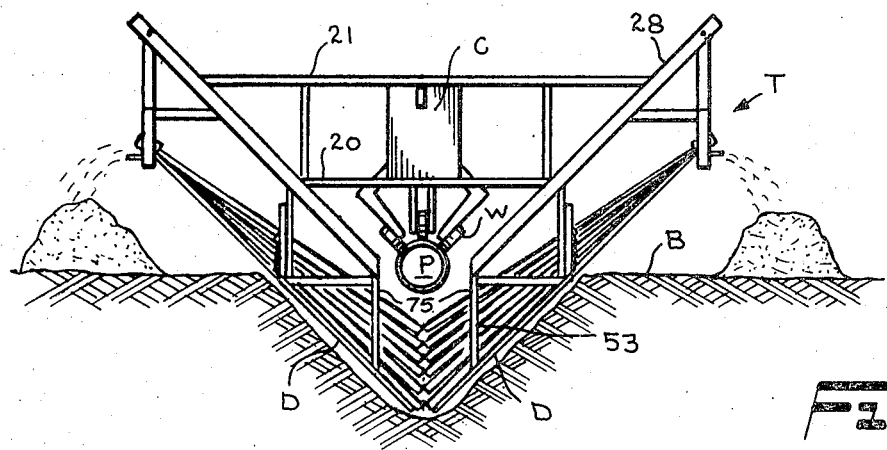
FIG. 2 is a rear view of the apparatus showing it in position providing a trench beneath the pipeline.
Figure 3:
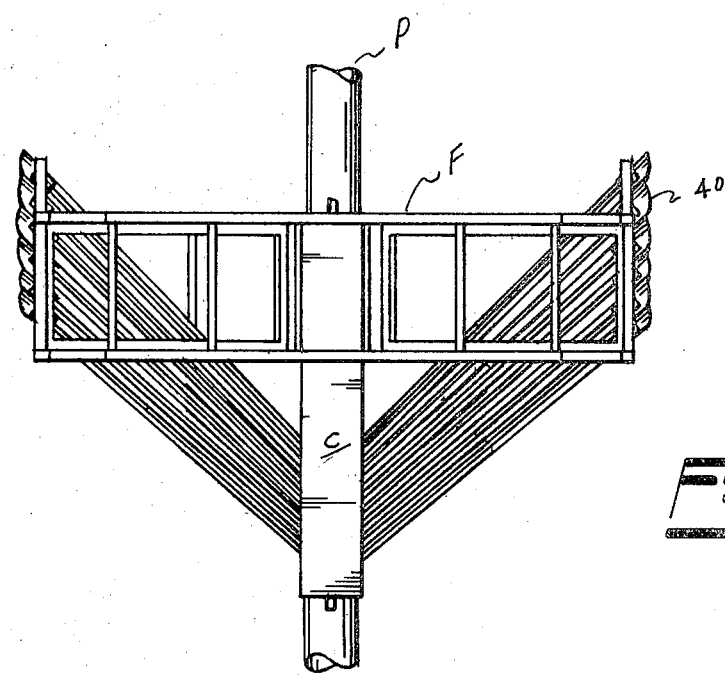
FIG. 3 is a top view of the trenching apparatus of the present invention.

The trenching apparatus of the present invention is designated generally T in FIGS. 1 and 2 of the drawings. Such apparatus is shown positioned on a pipeline P which is normally disposed on the submerged bottom B of some water body. Briefly, the trenching apparatus T includes a carriage or drive apparatus C which is normally driven or moved along the pipe P on a plurality of rollers or wheels W. Such carriage C is shown positioned in and secured to a superstructure or framework F which straddles the pipe P and which carries a pair of downwardly and forwardly inclined auger assemblies which are mounted on each side of the pipe and which are adapted to be moved downwardly into position beneath the pipe. Such auger assemblies A include augers which are disposed in suitable trays for guiding and carrying the material which is cut by the augers and also, includes trench retainers D which are inclined plates disposed on either side of the pipe and rearwardly of the augers for holding the side of the trench in the desired configuration after the cutting mechanism has passed thereover. The trench retainers shore or hold the ditch or trench open for receiving the pipe P. After the bottom has been cut away from beneath the pipe P, such pipe naturally sags or falls into the trench and follows the contour of the bottom of the trench.

Considering now the apparatus of the present invention in more detail, the carriage C preferably comprises a rectangular box or container made of welded plates of steel or other suitable material and includes a top 11, sides 12, ends 13 and a bottom 14. The carriage C preferably contains guidance means for automatically guiding the carriage C and the auger assemblies A along the pipe without rolling to either side. Such carriage preferably has one or more hydraulic motors positioned therein for driving the plurality of wheels or rollers W. The guidance system may include controls for regulating the speed of rotation of the augers in each auger assembly.

The wheels or rollers W are mounted on arms or wheel supports 16 which are spaced along opposite sides of the carriage C and which engage the pipe on opposite sides of its center line. Also, as shown in the drawings a series of longitudinally spaced wheels W' are provided beneath the carriage C. Such wheels W' extend directly beneath the carriage container C and engage the top of the pipe P. The wheels W' are connected so as to be operably driven by means of the hydraulic motor (not shown) disposed within the carriage container C. Such wheels frictionally engage the top of the pipe P and in conjunction with the augers A propel or move the apparatus T along the pipe P.

A lifting or towing fixture 19, which comprises a steel plate or member having a suitable opening therethrough for receiving a cable or other connecting means, is provided at the forward end 13 of the carriage C to facilitate supporting or moving the apparatus T if desired.

The frame F includes a pair of lower beams or support members 20 and a pair of upper beams or support members 21 which are disposed substantially parallel to each other. A plurality of horizontally extending members 22 connect the adjacent upper members 21 and similarly, a plurality of horizontally extending members 23 connect the adjacent lower members 20.

Also, a plurality of vertically extending beams or members 25 connect adjacent upper and lower members 20 and 21 respectively. Further, the frame F also includes pairs of inclined channel members 28 on either end of the members 20 and 21 in which the auger assemblies are slidably mounted. Such inclined channel beams 28 receive beam members 28a which are joined together at their upper ends by transverse members 29 and include depending arms or brackets 30 having horizontal members 31 which extend beneath the outer ends of the trays 40 on which the augers are carried. Further, it will be appreciated that the carriage C is detachably affixed to the frame F. As shown in FIGS. 1 and 2 of the drawings the carriage C rests on the upper side of the lower beams 20.

As shown in FIGS. 1 and 2 of the drawings the frame also includes support members 75 which depend downwardly from the lower end of the inclined beams 28a which are connected to the trench wall retainer or shoe D for holding the trench open.

Figure 4:
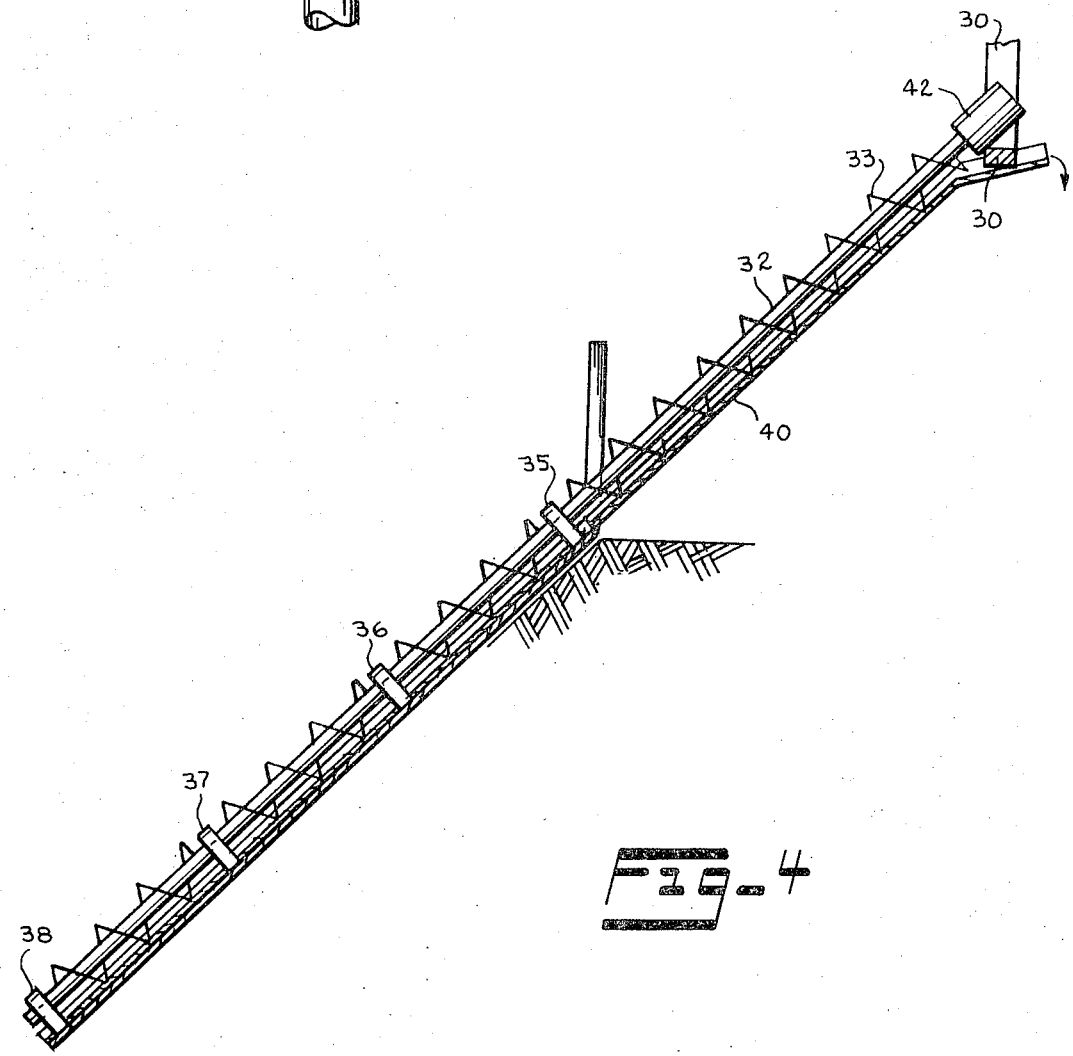
FIG. 4 is a view showing one of the augers and the tray beneath it for moving the cut material along the auger.

As shown in the drawings the groups of augers A each comprise a group of six augers arranged in side by side relationship however, it will be appreciated that the number of augers on either side of the apparatus T may be increased or decreased, as desired. As best seen in FIG. 4 of the drawings, the augers each comprise a longitudinally extending shaft 32 which is preferably formed of a steel rod or bar and which is provided with a spiral or helical projection 33 which extends around the shaft 32 from its upper end to adjacent at its lower end. The shaft 32 is rotatably mounted in a series of bearings carried in suitable bearing supports 35, 36, 37 and 38. It will appreciated that the number of bearing supports may be varied as needed. Such bearing supports are preferably "T" hanger type supports which support the shaft 32 and the surrounding helical land 33 a suitable spaced distance relative to the tray 40 which extends substantially parallel to the axis of shaft 32.

In the preferred form of this invention, a hydraulic motor 42 is provided at the upper end of the shaft 32 for rotating such shaft. As shown, the motors 42 are supported on the frame members 30 and 31. The tray 40 is shown in further detail in FIGS. 5 and 6 of the drawings. Such trays are arched or curved members which are either semi-circular or some shorter arc and are preferably joined together at their adjacent edges 41 so as to provide a continuous ramp or inclined surface adjacent the respective augers against which the dirt or fill or sand is moved upwardly by rotation of such augers. Also, as shown in the drawings, the lower portion of the trays 40 are supported by the inclined upper edge 50 of the vertical portion 51 of the trench retainer guide D and the lower portion of such trays 40 are supported by a beam member 53 as best seen in FIGS. 2 and 5 of the drawings.

As shown in FIG. 6, the inclined augers A are shown arranged so that their upper ends adjacent the motor drives 42 are aligned in a substantially horizontal plane, one adjacent the other, and are supported on the horizontally extending frame member 31. Also, there is shown in FIG. 6 the arrangement of the lower ends 60 of the augers. The forward most auger designated 62 is positioned so that its tray 40 is substantially parallel to the leading edge 64 of the inwardly and downwardly inclined trench retainer member 66 of the ditch guide designated D. Above the inclined trench retainer 66 is provided a substantially vertically extending side member 51.

The other auger members which are positioned rearwardly of the forwardmost auger member 62 are disposed so that their lower ends are each positioned rearwardly and slightly above the lower end of the next adjacent forward auger. Thus, it will be appreciated that the combined groups of augers projecting beneath the pipe P from either side are disposed so that the lowermost augers project the farthest forward and also extend deepest into the trench whereas the rearmost auger is at a higher elevation than any of the other augers and is in the rearmost position in the trench. Further, in the preferred form of this invention the forward two augers are provided with hobbed teeth 70 at their forwardmost ends and are driven at a relatively higher speed than that of the following auger. For example, the forwardmost augers may be driven at a rate of speed approximately 25 percent higher than that of the following augers.

It will be appreciated that the carriage C, the frame F and each of the auger assemblies are detachable from one another to facilitate transportation of the apparatus from place to place.

In using the submerged pipeline burial apparatus of the present invention, it will be appreciated that the trenching apparatus T is assembled with the auger assemblies A in an upper position with their frame member 28a slid upwardly in the channels 28 of the frame F to faciliate the positioning of the apparatus on the pipe. The apparatus is then lowered by cables or other suitable devices into position astride the pipe P with the wheels or rollers W engaging the upper surface of such pipe. The augers are actuated and are simultaneously rotated while the auger assemblies are lowered so as to in effect dig the augers into position beneath the pipe. Once the augers have reached their lowermost position such as is shown in FIG. 6 of the drawings the drive mechanism in the carriage C is actuated to thus move the carriage longitudinally forward on the pipe P. As the augers rotate to dig or remove bottom material from beneath the pipeline such augers tend to force the trenching apparatus forward in conjunction with the drive means for rotating the wheels W. With the augers at the desired depth of the trench, the drive apparatus and the augers are simultaneously driven forward to thus dig or remove the bottom material from beneath the pipe P and deposit it on either side of the trench as illustrated in FIG. 2 of the drawings. Once the pipe has sagged into position on the bottom of the trench wave action and water motion in the sub-sea adjacent the trench will wash the fill which has been deposited on each side of the pipeline trench back into place on top of the pipe to thereby bury the pipe in the water bottom.

The foregoing disclosure and description of the invention are illustrative and explanatory thereof, and various changes in the size, shape, and materials as well as in the details of the illustrated construction may be made without departing from the spirt of the invention.

I claim:

1. A submerged pipeline burying apparatus for digging a trench beneath a pipe positioned on the bottom of a water body comprising;

carriage means adapted to be moved along the pipe;

auger means carried by said carriage with the lower ends of said auger means adapted to be positioned below said pipe for removing bottom material from the bottom below the pipeline, and tray means associated with said auger means for moving material dug by such auger means from beneath the pipe upwardly from the bottom.

2. The invention of claim 1 wherein said carriage means includes a plurality of wheels adapted to engage the upper surface of the pipe for moving such carriage there along.

3. The invention of claim 2 including drive means of operably connected to said wheels for driving such carriage along the pipe.

4. The invention of claim 1 wherein said carriage means includes a support frame extending transversely of the pipe for supporting said auger means.

5. The invention of claim 4 wherein said auger means are slidably mounted on said support frame and adapted to be moved relative to said pipe.

6. The invention of claim 5 including inclined ditch guide means mounted with said auger means and adapted to engage the lateral sides of the ditch after it is dug to hold such ditch open for receiving the pipe.

7. The invention of claim 1 wherein said auger means includes a plurality of augers positioned side by side with the upper end of such augers at substantially the same horizontal elevation and with the lower ends of such augers stepped one above the other with the forward auger being the lowest and the rear auger being the highest.

* * * * *